US009014120B2

(12) United States Patent
Lan et al.

(10) Patent No.: US 9,014,120 B2
(45) Date of Patent: Apr. 21, 2015

(54) METHOD OF RESOURCE ALLOCATION, SYSTEM AND TRANSMITTER

(71) Applicant: Fujitsu Limited, Kawasaki-shi, Kanagawa (JP)

(72) Inventors: Yuanrong Lan, Beijing (CN); Yi Wang, Beijing (CN); Yuantao Zhang, Beijing (CN); Hua Zhou, Beijing (CN); Jianming Wu, Beijing (CN)

(73) Assignee: Fujitsu Limited, Kawasaki (JP)

( * ) Notice: Subject to any disclaimer, the term of this patent is extended or adjusted under 35 U.S.C. 154(b) by 221 days.

(21) Appl. No.: 13/767,483

(22) Filed: Feb. 14, 2013

(65) Prior Publication Data

US 2013/0155987 A1  Jun. 20, 2013

Related U.S. Application Data

(63) Continuation of application No. PCT/CN2010/076061, filed on Aug. 17, 2010.

(51) Int. Cl.
*H04W 4/00* (2009.01)
*H04W 72/04* (2009.01)
*H04L 1/00* (2006.01)
*H04L 1/18* (2006.01)
*H04W 72/12* (2009.01)

(52) U.S. Cl.
CPC ......... *H04W 72/044* (2013.01); *H04L 1/0027* (2013.01); *H04L 1/1887* (2013.01); *H04W 72/1268* (2013.01); *H04L 1/0025* (2013.01); H04L 2001/0093 (2013.01)

(58) Field of Classification Search
None
See application file for complete search history.

(56) References Cited

U.S. PATENT DOCUMENTS

2009/0268685 A1* 10/2009 Chen et al. ............. 370/329
2011/0170499 A1* 7/2011 Nazar et al. ............. 370/329

OTHER PUBLICATIONS

Korean Intellectual Property Office Notice of Preliminary Rejection issued for corresponding Korean Patent Application No. 10-2013-7006573 and mailed Feb. 26, 2014. English translation attached.
International Search Report issued for corresponding international Patent Application No. PCT/CN2010/076061, mailed May 26, 2011. English translation attached.
LG Electronics, "PHICH Resource Assignment for UL SU-MIMO", Agenda Item: 6.4.3, Jun. 28-Jul. 2, 2010, R1-103975, 3GPP TSG RAN WG1 Meeting #61bis, Dresden, Germany.
Alcatel-Lucent et al., "PHICH resource allocation in LTE-A", Agenda Item: 6.2.2, Jun. 28-Jul. 2, 2010, R1-104075, 3GPP TSG-RAN WG1 #61bis, Dresden, Germany.

(Continued)

*Primary Examiner* — Otis L Thompson, Jr.
(74) *Attorney, Agent, or Firm* — Myers Wolin, LLC

(57) ABSTRACT

A method of resource allocation, system and transmitter that the method includes scheduling a plurality of receivers by a transmitter according to requests for transmitting uplink data sent by the plurality of receivers, determining, respectively for each of the plurality of receivers, the uplink shared transmission channel resources, the used mapping relation of resources and the final cyclic shift n(DM_RS) for indicating an uplink feedback channel, according to the result of scheduling, a predefined mapping relation of resources, a spare mapping relation of resources and the n(DM_RS) and notifying the plurality of receivers by the transmitter of the determined uplink shared transmission channel resources of the plurality of receivers, the used mapping relation of resources and the final n(DM_RS).

20 Claims, 8 Drawing Sheets

(56) References Cited

OTHER PUBLICATIONS

Non-Final Rejection issued for corresponding Japanese Patent Application No. 2013-524329, mailed Feb. 18, 2014, with an English translation.

Office Action issued for corresponding Chinese Patent Application No. 201080068509.X dated Feb. 28, 2015 with a partial English translation.

Search Report for corresponding Chinese Patent Application No. 201080068509.X dated Feb. 4, 2015 with an English translation.

* cited by examiner

METHOD OF RESOURCE ALLOCATION, SYSTEM AND TRANSMITTER

CROSS REFERENCE TO RELATED APPLICATIONS

This is a continuation of Application PCT/CN2010/076061, filed on Aug. 17, 2010, the contents of which are herein wholly incorporated by reference.

TECHNICAL FIELD

The present invention relates to the field of wireless communication, and in particular to a method of resource allocation, system and transmitter.

BACKGROUND ART

In a long-term evolution (LTE) system, a base station (BS) allocates resource information to user equipment (UE) needed by it in transmitting or receiving data, comprising information on uplink shared channel resources and information on physical hybrid ARQ indicator channel (PHICH) used by the UE in transmitting uplink data, and then the BS notifies the resource information to the UE; hence, the UE may use the allocated uplink resources to transmit uplink data, and detect information on downlink feedback acknowledgement (ACK)/negative acknowledgement (NACK) at a corresponding PHICH; wherein ACK denotes that data is correctly received, and NACK denotes that data is wrongly received.

In the implementation of the present invention, the inventors found that there existed following problem: after the BS preliminarily allocates uplink resources to each piece of UE, when PHICH resources are allocated to each piece of UE, a problem that different pieces of UE indicate the same PHICH resource will possibly occur, thereby resulting in collision of the PHICH resources; in such a case, the BS does not allocate resource information to those pieces of UE where collision occurs, leading to that the pieces of UE cannot upload data, or the BS adjusts an index of the minimal uplink resource block of the UE, bringing limit to the scheduling algorithm.

Collision of PHICH resources will be described below by way of examples.

For Rel.8, as the number of available PHICHs is less than the number of physical resource blocks (PRBs) in the system, collision of PHICHs will inevitably occur.

Refer to Table 1, in which cases where minimal PRB indices $I_{lowest-index}$ from 0 to 35 are illustrated only.

downlink PHICHs is 32; if the lowest PRB index allocated preliminarily by the BS to UE1 is $I_{lowest-index}=0$, and the number of the virtually continuously allocated PRBs is 5, then it can be seen from Table 1 that the PHICH resource that can be allocated by the BS to the UE1 is PHICH (0,0); and for UE2, if the lowest PRB index $I_{lowest-index}=32$, and the number of the virtually continuously allocated PRBs is 5, then it can be seen from Table 1 that the PHICH resource that can be allocated by the BS to the UE2 is also PHICH (0,0). Therefore, even though the lowest resource blocks of the UE1 and UE2 are different, the PHICH resources are identical, the identical PHICH resources allocated to different pieces of UE being referred to herein as collision of PHICH resources. Hence, the BS does not notify the resource information to the UE2, causing that the UE2 cannot upload data, or the BS adjusts an index of the minimal uplink resource block of the UE, bringing limit to the scheduling algorithm.

In Rel.8, in order to solve the above problem, a value n (DM_RS) to which a 3-bit uplink demodulation_reference symbol (DM_RS) cyclic shift corresponds and a lowest PRB index are cooperatively used to instruct PHICH resource. In this way, for an uplink PUSCH channel, there are 8 PHICH channels available, and the BS, for the comprehensive consideration, may allocate different PHICH resources to UE in which collision is possible to occur, thereby alleviating the possibility of collision to a certain extent. Refer to tables 2a and 2b, in which relationship between a lowest PRB index, an index of a PHICH group and n (DM_RS) is shown in Table 2a, and relationship between a lowest PRB index, the sequence index within the group of PHICH and n (DM_RS) is shown in Table 2b.

TABLE 1

| I_lowest | 0 | 1 | 2 | 3 | 4 | 5 | 6 | 7 | 8 | 9 | 10 | 11 | 12 | 13 | 14 | 15 | ... | 26 | 27 | 28 | 29 | 30 | 31 | 32 | 33 | 34 | 35 |
|---|---|---|---|---|---|---|---|---|---|---|---|---|---|---|---|---|---|---|---|---|---|---|---|---|---|---|---|
| n(group) | 0 | 1 | 2 | 3 | 0 | 1 | 2 | 3 | 0 | 1 | 2 | 3 | 0 | 1 | 2 | 3 | ... | 2 | 3 | 0 | 1 | 2 | 3 | 0 | 1 | 2 | 3 |
| n(serial number) | 0 | 0 | 0 | 0 | 1 | 1 | 1 | 1 | 2 | 2 | 2 | 2 | 3 | 3 | 3 | 3 | ... | 6 | 6 | 7 | 7 | 7 | 7 | 0 | 0 | 0 | 0 |

For example, for a 10 MHz system, the number of the PRBs is 50, and it is assumed that the number of the available

| | n(group) | I(lowest_index, PRB_RA) | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|
| | n(DM_RS) | 0 | 1 | 2 | 3 | 4 | 5 | 6 | 7 | 8 | 9 | 10 | 11 | 12 | 13 | 14 | 15 | ... | 26 | 27 | 28 | 29 | 30 | 31 | 32 | 33 | 34 | 35 |
| 2a | 0 | 0 | 1 | 2 | 3 | 0 | 1 | 2 | 3 | 0 | 1 | 2 | 3 | 0 | 1 | 2 | 3 | ... | 2 | 3 | 0 | 1 | 2 | 3 | 0 | 1 | 2 | 3 |
| | 1 | 1 | 2 | 3 | 0 | 1 | 2 | 3 | 0 | 1 | 2 | 3 | 0 | 1 | 2 | 3 | 0 | ... | 3 | 0 | 1 | 2 | 3 | 0 | 1 | 2 | 3 | 0 |

-continued

| | | | | | | | | | | | | | | | | | | | | | | | | | | | |
|---|---|---|---|---|---|---|---|---|---|---|---|---|---|---|---|---|---|---|---|---|---|---|---|---|---|---|---|
| 2 | 2 | 3 | 0 | 1 | 2 | 3 | 0 | 1 | 2 | 3 | 0 | 1 | 2 | 3 | 0 | 1 | ... | 0 | 1 | 2 | 3 | 0 | 1 | 2 | 3 | 0 | 1 |
| 3 | 3 | 0 | 1 | 2 | 3 | 0 | 1 | 2 | 3 | 0 | 1 | 2 | 3 | 0 | 1 | 2 | ... | 1 | 2 | 3 | 0 | 1 | 2 | 3 | 0 | 1 | 2 |
| 4 | 0 | 1 | 2 | 3 | 0 | 1 | 2 | 3 | 0 | 1 | 2 | 3 | 0 | 1 | 2 | 3 | ... | 2 | 3 | 0 | 1 | 2 | 3 | 0 | 1 | 2 | 3 |
| 5 | 1 | 2 | 3 | 0 | 1 | 2 | 3 | 0 | 1 | 2 | 3 | 0 | 1 | 2 | 3 | 0 | ... | 3 | 0 | 1 | 2 | 3 | 0 | 1 | 2 | 3 | 0 |
| 6 | 2 | 3 | 0 | 1 | 2 | 3 | 0 | 1 | 2 | 3 | 0 | 1 | 2 | 3 | 0 | 1 | ... | 0 | 1 | 2 | 3 | 0 | 1 | 2 | 3 | 0 | 1 |
| 7 | 3 | 0 | 1 | 2 | 3 | 0 | 1 | 2 | 3 | 0 | 1 | 2 | 3 | 0 | 1 | 2 | ... | 1 | 2 | 3 | 0 | 1 | 2 | 3 | 0 | 1 | 2 |

| n(seq, PHICH) | | I(lowest_index, PRB_RA) | | | | | | | | | | | | | | | | | | | | | | | | | |
|---|---|---|---|---|---|---|---|---|---|---|---|---|---|---|---|---|---|---|---|---|---|---|---|---|---|---|---|
| n(DM_RS) | 0 | 1 | 2 | 3 | 4 | 5 | 6 | 7 | 8 | 9 | 10 | 11 | 12 | 13 | 14 | 15 | ... | 26 | 27 | 28 | 29 | 30 | 31 | 32 | 33 | 34 | 35 |

| 2b | | | | | | | | | | | | | | | | | | | | | | | | | | | | |
|---|---|---|---|---|---|---|---|---|---|---|---|---|---|---|---|---|---|---|---|---|---|---|---|---|---|---|---|
| 0 | 0 | 0 | 0 | 0 | 1 | 1 | 1 | 1 | 2 | 2 | 2 | 2 | 3 | 3 | 3 | 3 | ... | 6 | 6 | 7 | 7 | 7 | 7 | 0 | 0 | 0 | 0 |
| 1 | 1 | 1 | 1 | 1 | 2 | 2 | 2 | 2 | 3 | 3 | 3 | 3 | 4 | 4 | 4 | 4 | ... | 7 | 7 | 0 | 0 | 0 | 0 | 1 | 1 | 1 | 1 |
| 2 | 2 | 2 | 2 | 2 | 3 | 3 | 3 | 3 | 4 | 4 | 4 | 4 | 5 | 5 | 5 | 5 | ... | 0 | 0 | 1 | 1 | 1 | 1 | 2 | 2 | 2 | 2 |
| 3 | 3 | 3 | 3 | 3 | 4 | 4 | 4 | 4 | 5 | 5 | 5 | 5 | 6 | 6 | 6 | 6 | ... | 1 | 1 | 2 | 2 | 2 | 2 | 3 | 3 | 3 | 3 |
| 4 | 4 | 4 | 4 | 4 | 5 | 5 | 5 | 5 | 6 | 6 | 6 | 6 | 7 | 7 | 7 | 7 | ... | 2 | 2 | 3 | 3 | 3 | 3 | 4 | 4 | 4 | 4 |
| 5 | 5 | 5 | 5 | 5 | 6 | 6 | 6 | 6 | 7 | 7 | 7 | 7 | 0 | 0 | 0 | 0 | ... | 3 | 3 | 4 | 4 | 4 | 4 | 5 | 5 | 5 | 5 |
| 6 | 6 | 6 | 6 | 6 | 7 | 7 | 7 | 7 | 0 | 0 | 0 | 0 | 1 | 1 | 1 | 1 | ... | 4 | 4 | 5 | 5 | 5 | 5 | 6 | 6 | 6 | 6 |
| 7 | 7 | 7 | 7 | 7 | 0 | 0 | 0 | 0 | 1 | 1 | 1 | 1 | 2 | 2 | 2 | 2 | ... | 5 | 5 | 6 | 6 | 6 | 6 | 7 | 7 | 7 | 7 |

For example, if the lowest PRB index allocated preliminarily by the BS to UE1 is $I_{lowest-index}=0$, and the number of the virtually continuously allocated PRBs is 5, then it can be seen from tables 2a and 2b that when the n (DM_RS)=0, PHICH resource that can be allocated by the BS to the UE1 is PHICH (0,0); and for UE2, if the lowest PRB index $I_{lowest-index}=32$, the number of the virtually continuously allocated PRBs is 5, and the n (DM_RS)=0, then it can be seen from tables 2a and 2b that the PHICH resource that can be allocated by the BS to the UE2 is also PHICH (0,0). Thus, collision of PHICH resources occurs. At present, in order to solve the above problem of collision of PHICH resources, the BS may select different n (DM_RS) values for the UE2. For example, the BS may select one of n(DM_RS)=1~7 having an idle PHICH, such as n(DM_RS)=1. At this moment, it can be seen from tables 2a and 2b that the PHICH resource that is allocated to the UE2 is PHICH (1,1), thereby alleviating occurrence of collision to a certain extent.

Although collision may be avoided by using the above manner, it can be seen from tables 2a and 2b that there are only seven n (DM_RS) values available for allocation. Therefore, in the versions of Rel.10 and later, due to carrier aggregation, multiple-input multiple output (MIMO) and other cases possibly occur, the probability of collision exceeds an acceptable extent.

It should be noted that the cause of occurrence of PHICH collision is not due to insufficient PHICH resources (the number of PHICHs configured by the system is not less than the number of the pieces of the uplink UE), and collision is possible to occur when there are relatively sufficient PHICH resources.

For example, for a 10 MHz system, the number of the PRBs is 50, and it is assumed that the number of the available PHICHs is 32; it can be seen from tables 2a and 2b that the number of table sets available for 50 PRBs is 4, which are table_0, table_1, table 2 and table 3, respectively, each table set denoting the case of use of the PHICHs. Table_0 and table_1 are only shown below.

table_0

| n(seq) \ n(group) | 0 | 1 | 2 | 3 |
|---|---|---|---|---|
| 0 | • | | | |
| 1 | | • | | |
| 2 | | | • | |
| 3 | | | | • |
| 4 | • | | | |
| 5 | | • | | |
| 6 | | | • | |
| 7 | | | | • |

2a

| n(group) | I(lowest_index, PRB_RA) | | | | | | | | | | |
|---|---|---|---|---|---|---|---|---|---|---|---|
| n(DM_RS) | 0 | 1 | 2 | 3 | 4 | 5 | 6 | 7 | 8 | 9 | 10 |
| 0 | 0 | 1 | 2 | 3 | 0 | 1 | 2 | 3 | 0 | 1 | 2 |
| 1 | 1 | 2 | 3 | 0 | 1 | 2 | 3 | 0 | 1 | 2 | 3 |
| 2 | 2 | 3 | 0 | 1 | 2 | 3 | 0 | 1 | 2 | 3 | 0 |
| 3 | 3 | 0 | 1 | 2 | 3 | 0 | 1 | 2 | 3 | 0 | 1 |
| 4 | 0 | 1 | 2 | 3 | 0 | 1 | 2 | 3 | 0 | 1 | 2 |
| 5 | 1 | 2 | 3 | 0 | 1 | 2 | 3 | 0 | 1 | 2 | 3 |
| 6 | 2 | 3 | 0 | 1 | 2 | 3 | 0 | 1 | 2 | 3 | 0 |
| 7 | 3 | 0 | 1 | 2 | 3 | 0 | 1 | 2 | 3 | 0 | 1 |

-continued table_1

| n(group) | 0 | 1 | 2 | 3 |
|---|---|---|---|---|
| n(seq) 0 |  | • |  |  |
| 1 |  |  | • |  |
| 2 |  |  |  | • |
| 3 | • |  |  |  |
| 4 |  | • |  |  |
| 5 |  |  | • |  |
| 6 |  |  |  | • |
| 7 | • |  |  |  |

2b

| n(seq, PHICH) | I(lowest_index, PRB_RA) | | | | | | | | | | | |
|---|---|---|---|---|---|---|---|---|---|---|---|---|
| n(DM_RS) | 0 | 1 | 2 | 3 | 4 | 5 | 6 | 7 | 8 | 9 | 10 |
| 0 | 0 | 0 | 0 | 0 | 1 | 1 | 1 | 1 | 2 | 2 | 2 |
| 1 | 1 | 1 | 1 | 1 | 2 | 2 | 2 | 2 | 3 | 3 | 3 |
| 2 | 2 | 2 | 2 | 2 | 3 | 3 | 3 | 3 | 4 | 4 | 4 |
| 3 | 3 | 3 | 3 | 3 | 4 | 4 | 4 | 4 | 5 | 5 | 5 |
| 4 | 4 | 4 | 4 | 4 | 5 | 5 | 5 | 5 | 6 | 6 | 6 |
| 5 | 5 | 5 | 5 | 5 | 6 | 6 | 6 | 6 | 7 | 7 | 7 |
| 6 | 6 | 6 | 6 | 6 | 7 | 7 | 7 | 7 | 0 | 0 | 0 |
| 7 | 7 | 7 | 7 | 7 | 0 | 0 | 0 | 0 | 1 | 1 | 1 |

Currently, according to the agreement between the BS and the UE, the table set used by the BS in allocating PHICH resources to the UE is one of table_0, table_1, table_2 and table_3, for example, table_0.

If the PHICH resource allocated by the BS to the UE1 is PHICH (0,0), when the PHICH resource allocated by the BS to the UE2 is PHICH (0,0), the BS may allocate to the UE2 one of the idle PHICH resources to which (DM_RS)=1-7 correspond so as to avoid collision; and if all the PHICH resources in table_0 are used, the BS cannot allocate the PHICH resources to the UE2 at present, even if there exist idle PHICH resources in any one of other table sets, such as table_1, table_2 and table_3. Therefore, PHICH collision will inevitably occur, thereby finally resulting in that the UE2 cannot transmit uplink data or the scheduling is limited.

Refer to tables 4a and 4b for cases of collision, in which the PUSCH lowest with $I_{lowest-index}$=0, 5, 10, 15, 16, 21, 26, 31, 32, 37, 42, 47, 48 uses a table set, such as table_0; for the use after the ninth one in that table set, collision will inevitably occur, and even if other table sets are idle, collision will occur.

TABLE 4a

| n(group) | I(lowest_index, PRB_RA) | | | | | | | | | | | |
|---|---|---|---|---|---|---|---|---|---|---|---|---|
| n(DM_RS) | 0 | 5 | 10 | 15 | 16 | 21 | 26 | 31 | 32 | 37 | 42 | 47 | 48 |
| 0 | 0 | 1 | 2 | 3 | 0 | 1 | 2 | 3 | 0 | 1 | 2 | 3 | 0 |
| 1 | 1 | 2 | 3 | 0 | 1 | 2 | 3 | 0 | 1 | 2 | 3 | 0 | 1 |
| 2 | 2 | 3 | 0 | 1 | 2 | 3 | 0 | 1 | 2 | 3 | 0 | 1 | 2 |
| 3 | 3 | 0 | 1 | 2 | 3 | 0 | 1 | 2 | 3 | 0 | 1 | 2 | 3 |
| 4 | 0 | 1 | 2 | 3 | 0 | 1 | 2 | 3 | 0 | 1 | 2 | 3 | 0 |
| 5 | 1 | 2 | 3 | 0 | 1 | 2 | 3 | 0 | 1 | 2 | 3 | 0 | 1 |
| 6 | 2 | 3 | 0 | 1 | 2 | 3 | 0 | 1 | 2 | 3 | 0 | 1 | 2 |
| 7 | 3 | 0 | 1 | 2 | 3 | 0 | 1 | 2 | 3 | 0 | 1 | 2 | 3 |

TABLE 4b

| n(seq, PHICH) | I(lowest_index, PRB_RA) | | | | | | | | | | | |
|---|---|---|---|---|---|---|---|---|---|---|---|---|
| n(DM_RS) | 0 | 5 | 10 | 15 | 16 | 21 | 26 | 31 | 32 | 37 | 42 | 47 | 48 |
| 0 | 0 | 1 | 2 | 3 | 4 | 5 | 6 | 7 | 0 | 1 | 2 | 3 | 4 |
| 1 | 1 | 2 | 3 | 4 | 5 | 6 | 7 | 0 | 1 | 2 | 3 | 4 | 5 |
| 2 | 2 | 3 | 4 | 5 | 6 | 7 | 0 | 1 | 2 | 3 | 4 | 5 | 6 |
| 3 | 3 | 4 | 5 | 6 | 7 | 0 | 1 | 2 | 3 | 4 | 5 | 6 | 7 |
| 4 | 4 | 5 | 6 | 7 | 0 | 1 | 2 | 3 | 4 | 5 | 6 | 7 | 0 |
| 5 | 5 | 6 | 7 | 0 | 1 | 2 | 3 | 4 | 5 | 6 | 7 | 0 | 1 |
| 6 | 6 | 7 | 0 | 1 | 2 | 3 | 4 | 5 | 6 | 7 | 0 | 1 | 2 |
| 7 | 7 | 0 | 1 | 2 | 3 | 4 | 5 | 6 | 7 | 0 | 1 | 2 | 3 |

Following documents are listed below for easy understanding of the present invention, which are incorporated herein by reference, as they are set forth in this text.

1) U.S. Pat. No. 7,414,989, ACK/NACK determination reliability for a communication device; and 2) UE6813261, Method of mobile communication and apparatus therefor.

SUMMARY OF THE INVENTION

An object of the embodiments of the present invention is to provide a method of resource allocation, system and transmitter, the transmitter may use predefined and spare mapping relations of resources to select PHICH resources for each piece of UE, thereby alleviating or completely avoiding the occurrence of collision of PHICH resources.

According to an aspect of the embodiments of the present invention, there is provided a method of resource allocation, comprising:

scheduling a plurality of receivers by a transmitter according to requests for transmitting uplink data sent by the plurality of receivers, so as to preliminarily determine the uplink shared transmission channel resources for the plurality of receivers; the uplink shared transmission channel resources used by one receiver being determined by a lowest resource block index and the number of the resource blocks that are allocated virtually continuously;

determining, respectively for each of the plurality of receivers, the uplink shared transmission channel resources, the used mapping relation of resources and the final cyclic shift n(DM_RS) for indicating an uplink feedback channel, according to the result of scheduling, a predefined mapping relation of resources, a spare mapping relation of resources and the n(DM_RS); wherein the mapping relation of resources refers to the relation between the index of the lowest resource block, the cyclic shift n(DM_RS) and group number and sequence index within the group of the feedback channel; and notifying the plurality of receivers by the transmitter of the determined uplink shared transmission channel resources of the plurality of receivers, the used mapping relation of resources and the final n(DM_RS).

According to another aspect of the embodiments of the present invention, there is provided a transmitter, comprising:

a scheduling unit for scheduling a plurality of receivers according to the request for transmitting uplink data sent by the plurality of receivers, so as to preliminarily determine the uplink shared transmission channel resources of the plurality of receivers; the uplink shared transmission channel resources used by one receiver being determined by a lowest resource block index and the number of the resource blocks that are allocated virtually continuously;

a resource allocating unit for determining, respectively for each of the plurality of receivers, the uplink shared transmission channel resources, the used mapping relation of resources and the final cyclic shift n(DM_RS) for indicating an uplink feedback channel, according to the result of scheduling of the scheduling unit, a predefined mapping relation of resources, a spare mapping relation of resources and the n(DM_RS); wherein the mapping relation of resources refers to the relation between the index of the smallest resource block, the cyclic shift n(DM_RS) and group number and sequence index within the group of the feedback channel; and a resource notifying unit for notifying the plurality of receivers of the determined uplink shared transmission channel resources of the plurality of receivers determined by the resource allocating unit, the used mapping relation of resources and the final cyclic shift n(DM_RS).

According to a further aspect of the embodiments of the present invention, there is provided a wireless communication system, comprising at least one transmitter and at least one receiver, the transmitter allocating resources to the at least one receiver by using the method as described above, and the construction of the transmitter being as described above.

According to still another aspect of the embodiments of the present invention, there is provided a computer readable program, when the program is executed in a transmitter, the program enables the computer to carry out the method of resource allocation as described above in the transmitter.

According to further still another aspect of the embodiments of the present invention, there is provided a storage medium in which a computer readable program is stored, wherein the program enables the computer to carry out the method of resource allocation as described above in a transmitter.

The advantage of the embodiments of the present invention exists in that the transmitter may use at least two kinds of mapping relations of resources, namely, predefined and spare mapping relations of resources, to select PHICH resources for each piece of UE, which fully uses the idle PHICH resources of the system, thereby alleviating or completely avoiding the occurrence of collision of PHICH resources.

The particular embodiments of the present invention and manners of using the principle of the present invention are disclosed in detail with reference to the following description and attached drawings. It is understood that the invention is not limited correspondingly in scope. Rather, the invention includes all changes, modifications and equivalents coming within the spirit and terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

DETAILED DESCRIPTION OF THE INVENTION

Various embodiments of the present invention shall be described below in connection with accompanying drawings. These embodiments are illustrative only, and are not intended to limit the present invention. For easier understanding of the principle and embodiments of the present invention, the embodiments of the present invention shall be described taking a wireless communication system as an example. However, it is understood that the embodiments of the present invention are applicable to all the communication systems of collision avoidance, and are not limited to wireless communication systems.

Figure 1:
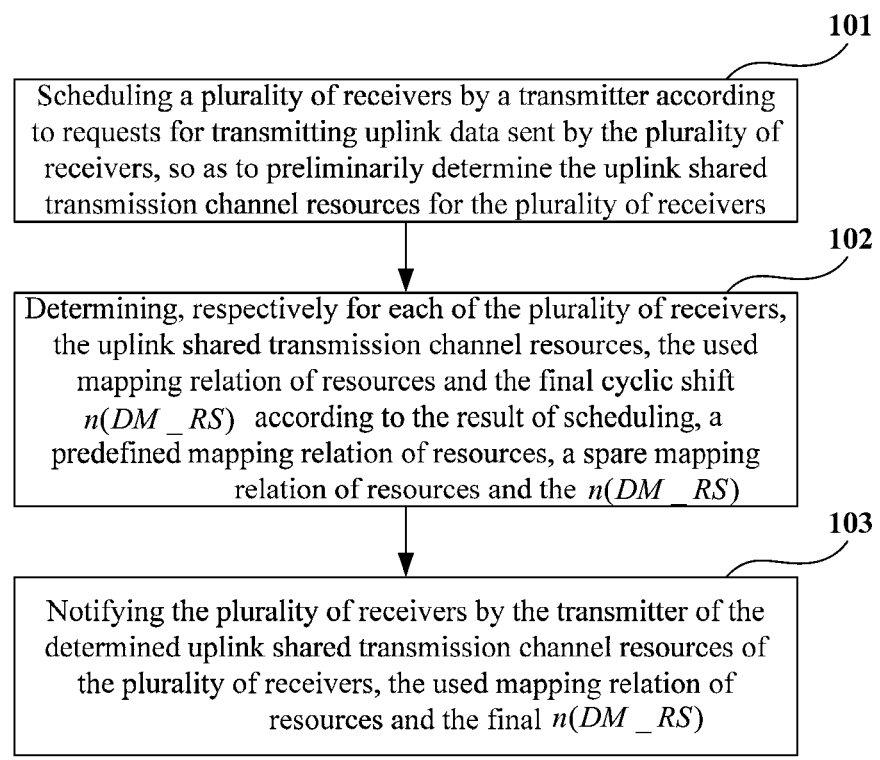
FIG. 1 is a flowchart of the method of resource allocation of embodiment 1 of the present invention.

FIG. 1 is a flowchart of the method of resource allocation of an embodiment of the present invention. As shown in FIG. 1, the method comprises:

step 101: scheduling a plurality of receivers by a transmitter according to requests for transmitting uplink data sent by the plurality of receivers, so as to preliminarily determine the uplink shared transmission channel resources for the plurality of receivers; the uplink shared transmission channel resources used by one receiver being determined by a lowest resource block index and the number of the resource blocks that are allocated virtually continuously;

step 102: determining, by the transmitter, respectively for each of the plurality of receivers, the uplink shared transmission channel resources, the used mapping relation of resources and the final cyclic shift n(DM_RS) for indicating an uplink feedback channel, according to the result of scheduling, a predefined mapping relation of resources, a spare mapping relation of resources and the n(DM_RS); wherein the mapping relation of resources refers to the relation between the index of the smallest resource block, the cyclic shift n(DM_RS) and group number and sequence index within the group of the feedback channel; and step 103: notifying the plurality of receivers by the transmitter of the determined uplink shared transmission channel resources of the plurality of receivers, the used mapping relation of resources and the final n(DM_RS).

It can be seen from the above embodiment that the transmitter may use at least two mapping relations of resources, namely, predefined and spare mapping relations of resources, to select feedback channel resources for each receiver, which fully uses the idle feedback channel resources, thereby alleviating or completely avoiding the occurrence of collision of resources.

In step 101, in a wireless communication system, when the plurality of receivers are started to establish connection with the transmitter, if the receivers need to transmit uplink data to the transmitter via a PUSCH, the receivers transmit request for transmitting data to the transmitter, and the transmitter may schedule a plurality of receivers according to the received requests, so as to preliminarily determine uplink shared transmission channel resources of the plurality of receivers; the uplink shared transmission channel resources comprise a lowest resource block index $I_{PRB\_RA}^{lowest}$ and the number $L_{CRB}$ of the resource blocks that are allocated virtually continuously; wherein the plurality of receivers may be scheduled by using any existing manner of scheduling, such as a round robin (RR) algorithm, a maximum C/I (Max C/I) scheduling algorithm, or a proportional fairness scheduling algorithm, which shall not be described any further.

After the transmitter allocates uplink shared transmission channel resources to each receiver, feedback channel resources for transmitting uplink feedback ACK/NACK by the transmitter to each receiver needs to be determined one by one, and then the determined uplink shared transmission channel resources and the used feedback channel are notified to each UE, such that each receiver detects downlink feedback ACK/NACK information at a corresponding feedback channel after transmitting uplink data via the PUSCH.

In this embodiment, the feedback channel resources may be PHICH resources, and the cyclic shift n(DM_RS) indicating the uplink feedback channel is 3-bit signaling, the 3 bits corresponding respectively to the numerical values in Table 5.

TABLE 5

| Cyclic Shift for DMRS Field in DCI format 0 in [4] | n(DM_RS) |
|---|---|
| 000 | 0 |
| 001 | 1 |
| 010 | 2 |
| 011 | 3 |
| 100 | 4 |
| 101 | 5 |
| 110 | 6 |
| 111 | 7 |

In this embodiment, the transmitter may be a BS, and the receivers may be UE.

Figure 2:
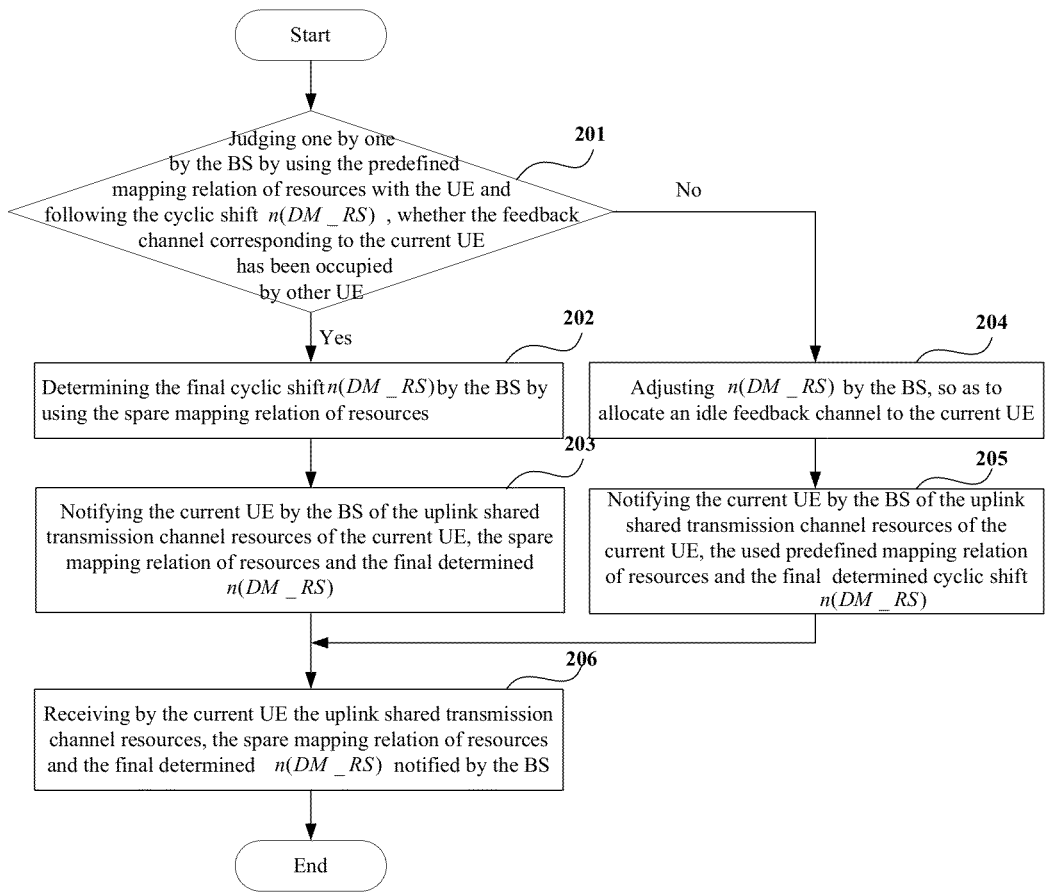
FIG. 2 is a flowchart of a method of allocating resources by a transmitter to one of a plurality of receivers of embodiment 1 of the present invention.

In steps 102 and 103, the transmitter respectively determines the uplink shared transmission channel resources used by each receiver, the used mapping relation of resources and the final n(DM_RS), and notifies the receivers. Following description is given taking that one of a plurality of receivers is determined, the transmitter is a BS, the receivers are UEs, and the feedback channel is a PHICH, as an example. FIG. 2 is a flowchart of a method of allocating resources by a BS to one of a plurality of pieces of UE of embodiment 1 of the present invention. When the BS allocates resources to one of a plurality of pieces of UE (referred to as current UE), as shown in FIG. 2, the method comprises:

step 201: judging one by one by the BS by using the predefined mapping relation of resources with the UE and following the cyclic shift n(DM_RS), whether the feedback channel corresponding to the current UE has been occupied by other UE; wherein the mapping relation of resources refers to the relation between the index $I_{PRB\_RA}^{lowest}$ of the lowest resource block index, the cyclic shift n(DM_RS) and group number $n_{PHICH}^{group}$ and sequence index within the group $n_{PHICH}^{seq}$ of the feedback channel;

step 202: determining the final cyclic shift n(DM_RS) by the BS by using the spare mapping relation of resources if the result of judgment is that the feedback channel has been occupied by other UE, so as to allocate an idle feedback channel to the current UE;

step 203: notifying the current receiver by the BS of the uplink shared transmission channel resources of the current receiver, the spare mapping relation of resources and the final determined cyclic shift n(DM_RS);

in this embodiment, if the result of judgment of step 201 is negative, step 204 is executed: adjusting sequentially the cyclic shift n(DM_RS) by the BS by using the predefined mapping relation of resources and the technologies in Rel. 8, as shown in tables 2a and 2b, until an idle PHICH resource is found; such a manner is similar to the prior art, which shall not be describe any further;

step 205: after the cyclic shift n(DM_RS) is determined in step 204, the BS notifies the current UE of the uplink shared transmission channel resources of the current UE, the used predefined mapping relation of resources and the final determined cyclic shift n(DM_RS); and step 206: after notifying the current UE of the uplink shared transmission channel resources of the current UE, the used mapping relation of resources and the final determined n(DM_RS) in steps 203 and 205, receiving by the UE the uplink shared transmission channel resources used by the UE, the used mapping relation of resources and the final determined n(DM_RS) transmitted by the BS.

It can be seen from the above embodiment that in allocating PHICH resources to the current UE by using a predefined mapping relation of resources, when the PHICH resources of the current UE and other UE collide, other idle PHICH resources may be selected for the current UE by using a spare mapping relation of resources, thereby alleviating or completely avoiding the occurrence of collision of resources.

In this embodiment, in step 201, when the bandwidth of the system is 10 MHz, the number of the PRBs is 50, it is assumed that the number of the available downlink PHICHs is 32, and the mapping relation of resources corresponds to 4 table sets as shown in tables 3a-3d, then the BS may negotiate in advance the used mapping relation of resources with the UE, as shown in table_0 in Table 3a. In this way, the BS may judge one by one whether the PHICH resources are occupied by other UE according to table_0 and 8 different cyclic shift n(DM_RS), namely, whether table_0 has been used for 8 times; if yes, it indicates that all the PHICH resources of the current UE have been occupied by other UE, and collision of PHICH resources will occur.

If the result of judgment in step 201 is positive, in the prior art, the BS cannot allocate resources to the current UE, causing that the current UE cannot transmit data.

While in the embodiment of the present invention, if the result of judgment in step 201 is positive, then in step 202, the BS will select the spare mapping relation of resources, such as that shown in table_1 or table_3, to select the cyclic shift n(DM_RS), so as to allocate idle PHICH resources for the current UE, thereby avoiding the collision of resources.

In step 203, the transmitter notifies the receiver of the uplink shared transmission channel resources of the receiver, the used mapping relation of resources and the final determined cyclic shift n(DM_RS). In an embodiment of the present invention, extra control information bits may be added to the downlink control channel to indicate the above resource information; however, relatively large changes need to be made to the original system; in another embodiment of the present invention, the original control information bits of the system may be used to transmit the above resource information, such as using several bits in the downlink control channel indicating the lowest PRB index of the PUSCH to which the current UE corresponds in the bandwidth of the system and the lengths of the resources that are occupied, to notify the allocated resources.

For example, taking a 10 MHz system as an example, in which there are 50 RBs, there will be 1275 manners of resource allocation (lowest at any location, continuous PRB length that is supported, and a total number of the combinations). In order to instruct a receiver to use a certain manner of resource allocation, at least 11 bits are needed for indication, and 11 bits may indicate at least 2048 possibilities; hence, the rest 2048−1275=773 states are unused. Therefore, these unused states may be used in the embodiment of the present invention to notify the allocated resources to the receivers, without needing to change the original system in implementation, thereby saving the cost.

In this embodiment, resource indication values (RIVs) may be used to indicate the uplink shared transmission channel resources and the used mapping relation of resources. The RIVs may be calculated by using the formulae below:

$$\text{if } (L_{CRBs}-1) \leq \lfloor N_{RB}^{DL}/2 \rfloor, \text{ then RIV}=N_{RB}^{UL}(L_{CRBs}-1)+ \text{RB}_{start}; \quad (1)$$

and if $(L_{CRBs}-1) > \lfloor N_{RB}^{UL}/2 \rfloor$, then the following formula is used:

$$\text{RIV}=N_{RB}^{DL}(N_{RB}^{UL}-L_{CRBs}+1)+(N_{RB}^{DL}-1-\text{RB}_{start}) \quad (2)$$

wherein a relation between the RIVs and the mapping relation of resources, the index $I_{PRB\_RA}^{lowest}$ of the lowest resource block and the number $L_{CRB}$ of the virtually continuously allocated resource blocks may be preset, namely, identical manners of resource allocation with different mapping relations of resources may correspond to different RIVs.

For example, in a case where a predefined mapping relation of resources is used, if the index of the lowest resource block allocated to current receiver $I_{PRB\_RA}^{lowest}$=48 and the number of the virtually continuously allocated resource blocks is $L_{CRB}$=2, a RIV=98 to which the resource corresponds may be obtained according to formula (1) (i.e. 50×(2−1)+48=98). If collision of PHICH resources occurs, a spare mapping relation of resources, such as table_1, is used. At this moment, an RIV negotiated in advance by the transmitter and the receiver may be used for indication (such an RIV is one of unused 773 (1275~2047) states, for example, RIV=1277 is used; in this way, the unused states may be fully used, without needing to add extra resource indication), as shown in Table 5. Therefore, the transmitter notifies RIV=1277 to the UE.

TABLE 5

| RIV | Mapping relation of resources | $I_{PRB\_RA}^{lowest}$ | $L_{CRB}$ |
|-----|-------------------------------|------------------------|-----------|
| 98  | Predefined mapping relation   | 48                     | 2         |
| 1277 | Spare mapping relation       | 48                     | 2         |

Therefore, when the UE receives the RIV transmitted by the transmitter, the index of the allocated smallest resource block $I_{PRB\_RA}^{lowest}$=48 and the number of the virtually continuously allocated resource blocks is $L_{CRB}$=2 may be reversely deducted, and the used spare mapping relation of resources may be obtained. Thus, the feedback channel resources may further be determined according to the spare mapping relation of resources and the cyclic shift n(DM_RS).

Table 6 shows the number of bits of the downlink control information transmitted under other system bandwidths, the used states and unused states.

TABLE 6

| Uplink bandwidth (RB) | 25 | 50 | 100 |
|-----------------------|-----|------|------|
| RIV bit length        | 9   | 11   | 13   |
| Needed number of states | 325 | 1275 | 5050 |
| Left number of states | 187 | 773  | 3142 |

Figure 3:
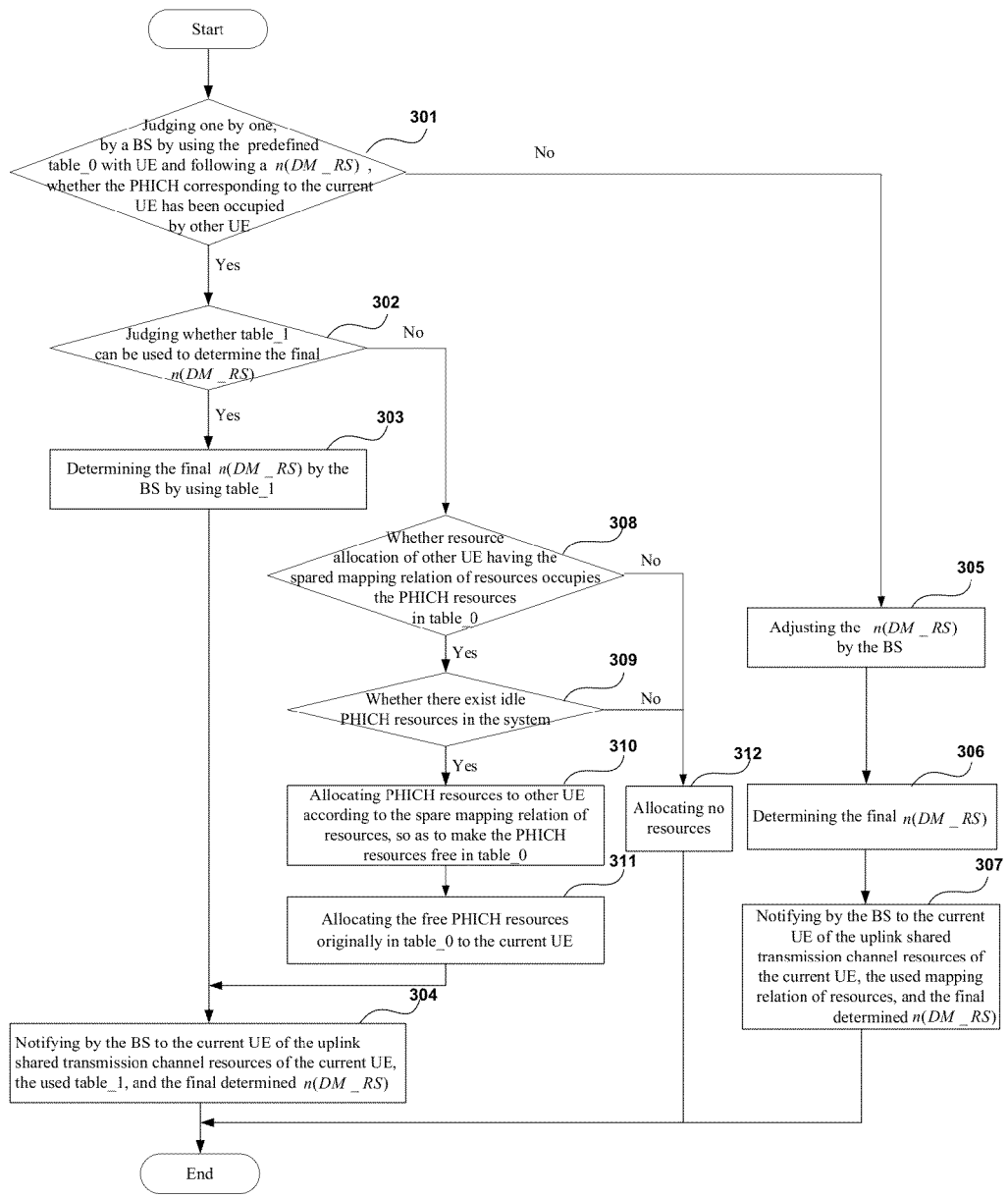
FIG. 3 is a flowchart of a method of allocating resources by a BS to one of a plurality pieces of UE of embodiment 1 of the present invention.

FIG. 3 is a flowchart of a method of allocating resources by a BS to one of a plurality pieces of UE of another embodiment of the present invention, which would be described taking table_0 corresponding to a predefined mapping relation of resources and table_1 corresponding to a spare mapping relation of resources as examples.

As shown in FIG. 3, the method comprises:

step 301: judging one by one, by a BS by using the predefined mapping relation of resources (table_0) with UE and following a cyclic shift n(DM_RS), whether the feedback channel corresponding to the current UE has been occupied by other receivers; wherein the mapping relation of resources refers to the relation between the index $I_{PRB\_RA}^{lowest}$ of the lowest resource block, the cyclic shift n(DM_RS) and group number $n_{PHICH}^{group}$ and sequence index within the group $n_{PHICH}^{seq}$ of the feedback channel;

step 302: judging by the BS whether the spare mapping relation of resources (table_1) can be used to determine the final cyclic shift n(DM_RS), if the result of judgment of step 301 is that the feedback channel has been occupied by other receivers;

wherein whether the current UE is capable of the spare mapping relation of resources is judged;

step 303: determining the final cyclic shift n(DM_RS) by the BS by using table_1 if the result of judgment of step 302 is positive, so as to allocate an idle feedback channel to the current UE;

step 304: notifying by the BS to the current UE of the uplink shared transmission channel resources of the current UE, the spare mapping relation of resources table_1, and the final determined cyclic shift n(DM_RS);

in this embodiment, if the result of judgment of step 301 is negative, steps 305 and 306 may be executed, and the transmitter may use the technologies in Rel. 8 to adjust n(DM_RS) in turn, and determines the final cyclic shift n(DM_RS);

step 307: notifying by the BS to the current UE of the uplink shared transmission channel resources of the current UE, the used mapping relation of resources, and the final determined cyclic shift n(DM_RS), the used mapping relation of resources at this moment is the predefined mapping relation of resources, i.e. table_0;

step 308: judging further by the BS whether resource allocation of other UE having the spare mapping relation of resources occupies the PHICH resources in table_0, if the result of judgment of step 302 is negative;

step 309: judging further by the BS whether there exist idle PHICH resources in the system, if the result of judgment of step 308 is positive;

step 310: shifting PHICH resources of other UE in table_0 by using the spare mapping relation of resources to which the other UE corresponds, if the result of judgment of step 309 is positive, so as to make the PHICH resources free in table_0;

step 311: allocating the free PHICH resources originally in table_0 to the UE; and step 312: not allocating resources to the current UE by the BS, or avoiding collision by changing a lowest resource block index, if the results of judgment of steps 308 and 309 are negative.

It can be seen from the above steps 308~311 that if the resource allocation of the UE having the spare mapping relation of resources is processed and if it is found that resources are available, it goes to step 305; and if the UE having the spare mapping relation of resources uses the PHICH (0,0) of table_0 and then the BS, in processing resource allocation of the UE having no spare mapping relation of resources, finds that the PHICH resources in table_0 have been used up, the PHICH resources of the UE having the spare mapping relation of resources may be indicated to another table, and at the same time, the UE having no spare mapping relation of resources is placed at the position that is left.

Figure 4:
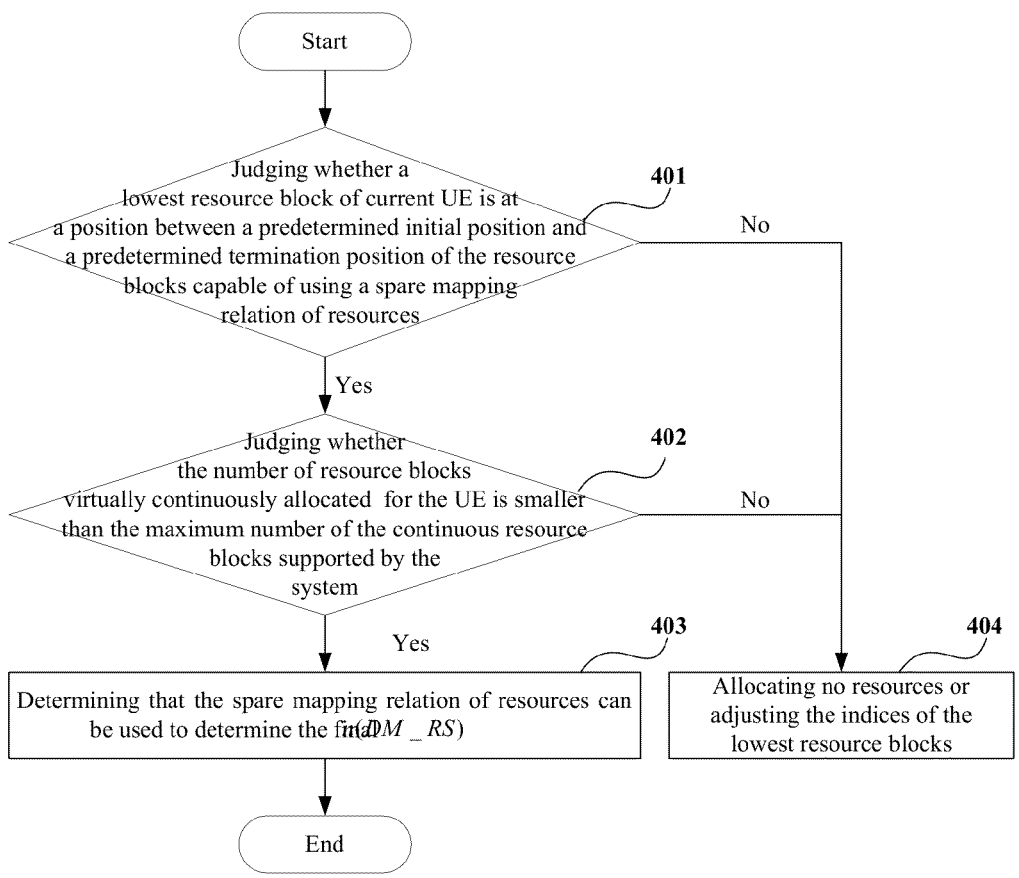
FIG. 4 is a flowchart of carrying out step 302 of an embodiment of the present invention.

FIG. 4 is a flowchart of carrying out step 302 of an embodiment of the present invention. As shown in FIG. 4, it comprises:

step 401: judging whether a lowest resource block of current UE that is preliminarily determined is at a position between a predetermined initial position and a predetermined termination position of the resource blocks capable of using a spare mapping relation of resources;

wherein the following manner may be used: determining an initial position index and a termination position index of the resource blocks capable of using a spare mapping relation of resources, according to the predetermined number M of the resource blocks capable of using a spare mapping relation of resources and the initial position or termination position to which the resource blocks correspond;

judging by the BS that the lowest resource blocks of the current UE are at the predetermined initial positions and termination positions of the continuous resource blocks capable of using the spare mapping relation of resources, if the lowest resource block index $I_{PRB\_RA}^{lowest}$ of the current UE is less than or equal to the termination position index and greater than or equal to the initial position index;

in this embodiment, M may be determined previously, and it is assumed that the positions of the M continuous resource blocks in bandwidth resources are known; if the initial position index of the M continuous resource blocks is 0, then the termination position index of the M continuous resource blocks is 0+M−1; however, it is not limited thereto, and the initial position index of the M continuous resource blocks may be other values;

step 402: judging further whether the number $L_{CRB}$ of resource blocks virtually continuously allocated for the current receiver that is preliminarily determined is smaller than the maximum number $L_{Thred}$ of the continuous resource blocks supported by the system, if the result of judgment of step 401 is positive;

step 403: determining by the BS that the spare mapping relation of resources can be used to determine the final cyclic shift n(DM_RS), if the result of judgment of step 402 is positive; otherwise, determining that the spare mapping relation of resources cannot be used to determine the final cyclic shift n(DM_RS).

In steps 401 and 402, if the results of judgment are negative, then step 404 is executed, and the BS does not allocate resources to the UE or avoids collision by changing the indices of the lowest resource blocks.

In this embodiment, the number M of the resource blocks capable of using the spare mapping relation of resources may be predetermined by using the manner below:

1) calculating a first calculation value $M_0$, using the following formula:

$$M_0 = \left\lfloor \frac{\sqrt{(N_{RB}^{UL} - x + 1)^2 + \frac{8R}{N}} - 1}{2} \right\rfloor + x - N_{NB}^{UL};$$

if the first calculation value $M_0$ is smaller than or equal to the maximum number $L_{Thred}$ of the continuous resource blocks supported by the system, $M = M_0$, wherein the maximum number of the continuous resource blocks supported by the system is $L_{Thred} = N_{NB}^{UL} - N_{PHICH}$;

if the first calculation value $M_0$ is greater than the maximum number $L_{Thred}$ of the continuous resource blocks supported by the system, the M is calculated using the following formula:

$$M = \left\lfloor \frac{R}{N \cdot L_{Thred}} + \frac{L_{Thred} - 1}{2} + \frac{(N_{RB}^{UL} - x) \cdot (1 + N_{RB}^{UL} - x)}{2 \cdot L_{Thred}} - N_{RB}^{UL} + x \right\rfloor;$$

where, x represents the termination position index of the resource block capable of using the spare mapping relation of resources, $N_{RB}^{DL}$ represents the band width of the system, N represents the number of the spare mapping relation of resources, and $N_{PHICH}$ represents the number of the feedback channels that can be used by the system.

In this embodiment, when the number of the PHICH groups that can be used by the system is 2, the number N of the spare mapping relations of resources is 1, indicating that there exist total two mapping relations; and when the number of the PHICH groups that can be used by the system is greater than 2, the number N of the spare mapping relations of resources is 2, indicating that there exist total three mapping relations.

For example, when the bandwidth of the system is 10 MHz, the number of the PRBs is 50, it is assumed that the number of the available downlink PHICHs is 32, and the mapping relation of resources corresponds to 4 table sets as shown in tables 3a-3d, then the number of the spare mapping relations of resources N=2.

For example, when the bandwidth of the system is 5 MHz, the number of the PRBs is 25, it is assumed that the number of the available downlink PHICHs is 16, and the number of the available PHICH groups is 2, then the number of the spare mapping relations of resources N=1.

It can be seen from the above embodiment that when the PHICH resources of the current receiver and other receivers collide, other idle PHICH resources may be selected for the current receiver by using spare mapping relations of resources, thereby alleviating or completely avoiding the occurrence of collision of PHICH resources; furthermore, the UE may be notified of the used uplink resources, the used mapping relations of resources and n(DM_RS) by using different RIVs, without needing to change the original system in implementation, thereby saving the cost.

It should be understood by those skilled in the art that all or part of the steps in the method of the above embodiments may be carried out by programs instructing related hardware, and the programs may be stored in a computer-readable storage medium. In the execution of the programs, all or part of the steps in the method of the above embodiments may be included, and the storage medium may comprise an ROM, an RAM, a floppy disk, and a compacted disk, etc.

An embodiment of the present invention further provides a transmitter as described below. As the principle of the transmitter for solving problems is similar to that of the above method of communication based on a transmitter, the implementation of the method may be referred to for the implementation of the transmitter, and the repeated parts shall not be described any further.

Figure 5:
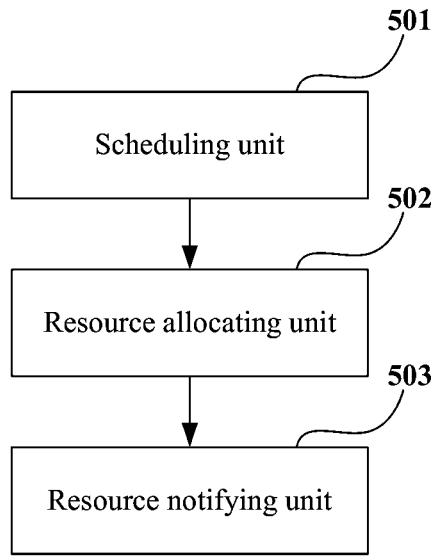
FIG. 5 is a schematic diagram of the structure of the transmitter of embodiment 2 of the present invention.

FIG. 5 is a schematic diagram of the structure of the transmitter of embodiment 2 of the present invention. As shown in FIG. 5, the transmitter comprises: a scheduling unit 501 for scheduling a plurality of receivers according to the request for transmitting uplink data sent by the plurality of receivers, so as to preliminarily determine the uplink shared transmission channel resources of the plurality of receivers; the uplink shared transmission channel resources used by one receiver being determined by a lowest resource block index and the number of the resource blocks that are allocated virtually continuously;

a resource allocating unit 502 for determining, respectively for each of the plurality of receivers, the uplink shared transmission channel resources, the used mapping relation of resources and the final cyclic shift n(DM_RS) for indicating an uplink feedback channel, according to the result of scheduling of the scheduling unit, a predefined mapping relation of resources, a spare mapping relation of resources and the n(DM_RS); wherein the mapping relation of resources refers to the relation between the index of the lowest resource block, the cyclic shift n(DM_RS) and group number and sequence index within the group of the feedback channel; and a resource notifying unit 503 for notifying the plurality of receivers of the determined uplink shared transmission channel resources of the plurality of receivers determined by the resource allocating unit, the used mapping relation of resources and the final cyclic shift n(DM_RS).

It can be seen from the above embodiment that the transmitter may use at least two kinds of mapping relations of resources, namely, predefined and spare mapping relations of resources, to select feedback channel resources for each receiver, which fully uses the idle feedback channel resources, thereby alleviating or completely avoiding the occurrence of collision of the resources.

Figure 6:
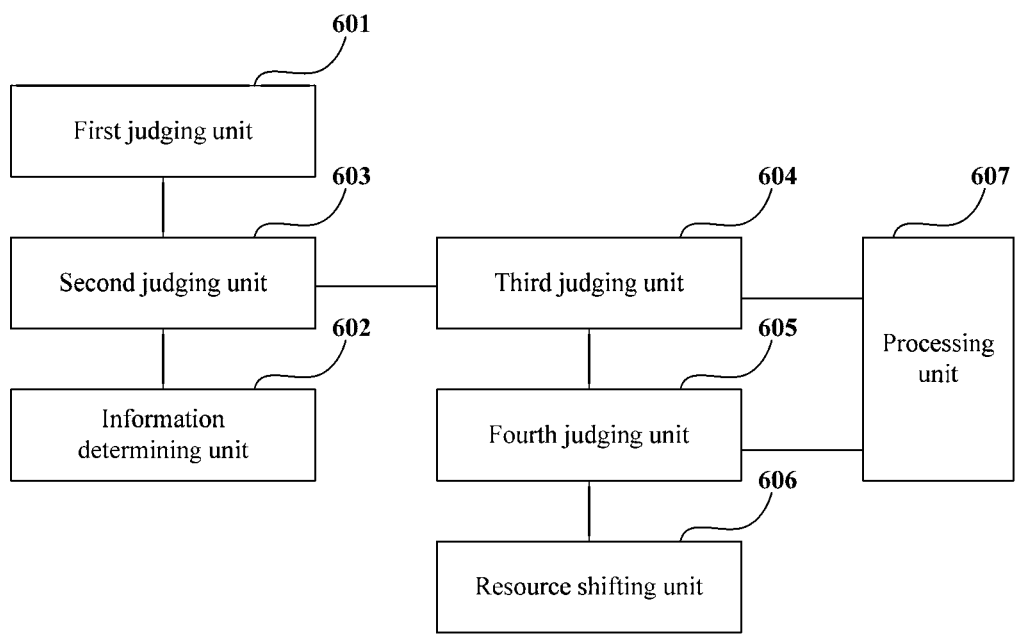
FIG. 6 is a schematic diagram of the structure of the resource allocating unit of embodiment 2 of the present invention.
Figure 7:
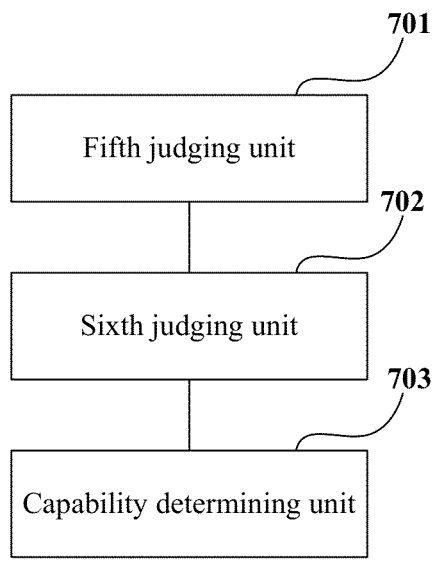
FIG. 7 is a schematic diagram of the structure of the second judging unit of FIG. 6.

FIG. 6 is a schematic diagram of the structure of the resource allocating unit of embodiment 2 of the present invention. As shown in FIG. 6, when determining the uplink shared transmission resources of a current receiver of the plurality of receivers, the used mapping relation of resources and the final cyclic shift n(DM_RS), the resource allocating unit 502 comprises:

a first judging unit 601 for judging one by one by using the predefined mapping relation of resources with the receivers and following the cyclic shift n(DM_RS) whether the feedback channel corresponding to the current receiver has been occupied by other receivers; and an information determining unit 602 for determining the final cyclic shift n(DM_RS) by using the spare mapping relation of resources if the result of judgment of the first judging unit 601 is that the feedback channel has been occupied by other receivers, so as to allocate an idle feedback channel to the current receiver.

In another embodiment, if the result of judgment of the first judging unit 601 is positive, whether a spare mapping relation of resources may be used can be estimated, and if the result of judgment is positive, the information determining unit 602 determines the final n(DM_RS) by using the spare mapping relation of resources. Hence, as shown in FIG. 6, the resource allocating unit 502 may further comprise:

a second judging unit 603 for judging whether the spare mapping relation of resources can be used to determine the final n(DM_RS) if the result of judgment of the first judging unit 601 is positive;

and the information determining unit 602 determines the final n(DM_RS) by using the spare mapping relation of resources if the result of judgment of the second judging unit 603 is positive.

Furthermore, if the resource allocation of the UE having the spare mapping relation of resources is processed first and then the BS, in processing resource allocation of the UE having no spare mapping relation of resources, finds that the PHICH resources have been used up, the PHICH resources of the UE having the spare mapping relation of resources may be indicated to another one having idle PHICH resources, and at the same time, the UE having no spare mapping relation of resources is placed at the position that is left.

Hence, in the present embodiment, as shown in FIG. 6, the resource allocating unit 502 may further comprise: a third judging unit 604, a fourth judging unit 605, a resource shifting unit 606 and a processing unit 607;

wherein the third judging unit 604 is used for judging further whether receivers having spare mapping relations of resources exist in the other receivers occupying the feedback channel resources, if the result of judgment of the second judging unit 604 is negative;

the fourth judging unit 605 is used for judging further whether idle feedback channel resources exist in the system, if the result of judgment of the third judging unit 604 is positive;

the resource shifting unit 606 is used for shifting the feedback channel resources of the other receivers to the idle feedback channel resources by using the spare mapping relations of resources corresponding to the other receivers, if the result of judgment of the fourth judging unit is positive, and allocating the feedback channel resources originally had by said other receiver to the current receiver; and the processing unit 607 is used for allocating no resource to the current receiver or adjusting the lowest resource block index of the current receiver that is preliminarily determined, if the results of judgment of the third judging unit 604 and the fourth judging unit 605 are negative.

In this embodiment, the second judging unit 603 may comprise a fifth judging unit 701, a sixth judging unit 702 and a capability determining unit 703, wherein the fifth judging unit 701 is used for judging whether the lowest resource block of the current receiver that is preliminarily determined is at a position between the predetermined initial position and the predetermined termination position of the resource block capable of using the spare mapping relation of resources;

the sixth judging unit 702 is used for judging further whether the number $L_{CRB}$ of resource blocks virtually continuously allocated by the current receiver that is preliminarily determined is smaller than the maximum number $L_{Thred}$ of the continuous resource blocks supported by the system, if the result of judgment of the fifth judging unit 701 is positive; and the capability determining unit 703 is capable of using the spare mapping relation of resources to determine the final cyclic shift n(DM_RS), if the result of judgment of the sixth judging unit 702 is positive; otherwise, it is not capable of using the spare mapping relation of resources.

Figure 8:
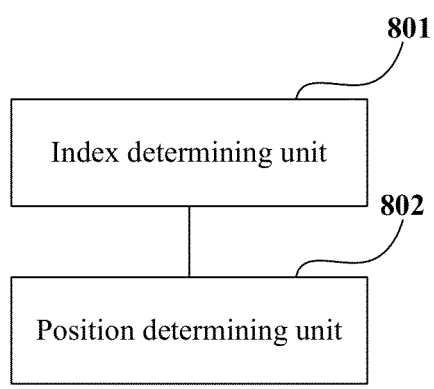
FIG. 8 is a schematic diagram of the structure of the fifth judging unit of FIG. 6.

In this embodiment, as shown in FIG. 8, the fifth judging unit 701 may comprise an index determining unit 801 and a position determining unit 802, wherein the index determining unit 801 is used for determining the initial position index and the termination position index of the continuous resource block capable of using the spare mapping relation of resources according to the predetermined number M of the resource blocks capable of using the spare mapping relation of resources and the predetermined initial position or termination position corresponding to the continuous resource blocks; and the position determining unit 802 is used for determining that the lowest resource block of the current receiver is at a position between the predetermined initial position and the predetermined termination position of the resource block capable of using the spare mapping relation of resources when the lowest resource block index $I_{PRB\_RA}^{lowest}$ of the current receiver is smaller than or equal to the termination position index and greater than or equal to the initial position index.

In this embodiment, the number M of the resource blocks capable of using the spare mapping relation of resources may be calculated by using the formula above, and the positions of the resource blocks capable of using the spare mapping relation of resources in the bandwidth resources may be predetermined, which shall not be described any further.

It can be seen from the above embodiment that when the PHICH resources of the current receiver and other receivers collide, other idle PHICH resources may be selected for the current receiver by using spare mapping relations of resources, thereby alleviating or completely avoiding the occurrence of collision of PHICH resources; furthermore, the UE may be notified of the used uplink resources, the used mapping relations of resources and the cyclic shift n(DM_RS) by using different RIVs, without needing to change the original system in implementation, thereby saving the cost.

Figure 9:
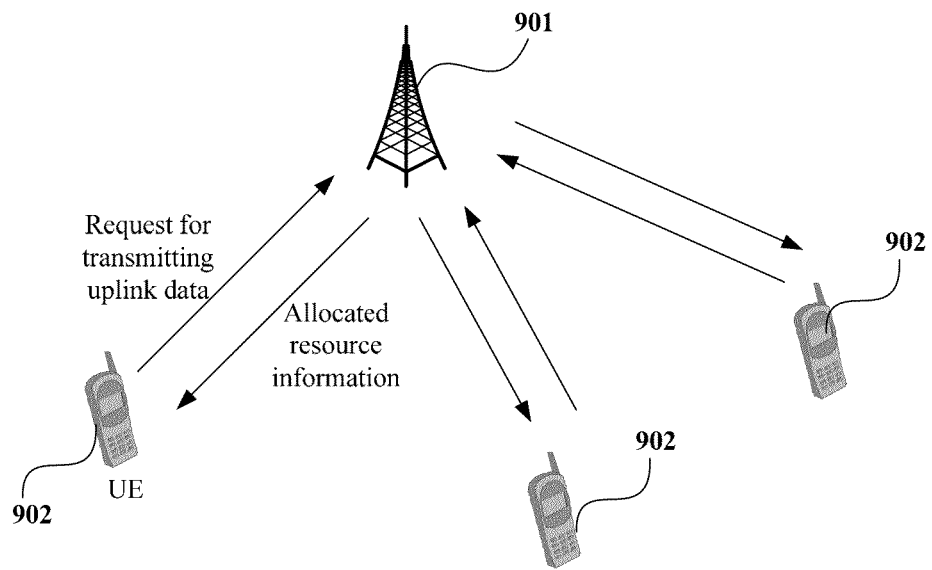
FIG. 9 is a schematic diagram of the structure of the wireless communication system of embodiment 3 of the present invention.

FIG. 9 is a schematic diagram of the structure of the wireless communication system of embodiment 3 of the present invention. As shown in FIG. 9, the system comprises at least one transmitter 901 and at least one receiver 902; wherein the transmitter 901 may be a BS, and the structure and implementation of which are as described in embodiments 1 and 2, which shall not be described any further.

As shown in FIG. 9, when the plurality of receivers 902 are started to establish connection with the transmitter 901, if the receivers 902 need to transmit uplink data to the transmitter 901 via a PUSCH, the receivers 902 transmit request for transmitting data to the transmitter, and the transmitter 901 determines the resource information used by the receivers 902 according to the received request, the resource information comprising uplink shared transmission channel resources, the used mapping relation of resource and the final n(DM_RS), which are as described in embodiment 1, and shall not be described any further.

Figure 10:
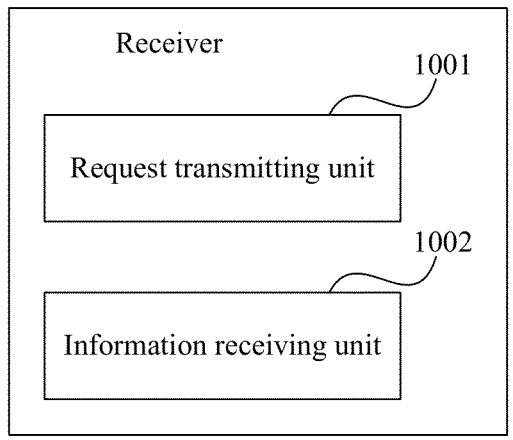
FIG. 10 is a schematic diagram of the structure of receiver of embodiment 3 of the present invention.

FIG. 10 is a schematic diagram of the structure of receiver of embodiment 3 of the present invention. As shown in FIG. 10, the receiver comprises at least a request transmitting unit 1001 configured to transmit a request for transmitting uplink data to the transmitter 901, such that the transmitter 901 allocates resources to the receiver according to the request.

Furthermore, as shown in FIG. 10, the receiver comprises an information receiving unit 1002 configured to receive the uplink shared transmission channel resources, the used mapping relation of resource and the final n(DM_RS) transmitted by the transmitter 901 according to the request.

The embodiment of the present invention is further described below taking a 10 MHz system as an example.

In the 10 MHz system, there are 50 RBs, 32 PHICH resources, the number of PHICH groups is 4, and the number N of the spare mapping relations of resources is 2, indicating that there are total three mapping relations; and it is assumed that the spare mapping relation of resources corresponds to table__0, and other spare mapping relations of resources correspond to table__1 and table__3;

in this system, 2048−1275=773 states are left unused;

the maximum number of the continuous resource blocks supported by the system $L_{CRB}$=50−32=18;

the number M of the resources capable of using the spare mapping relation of resources in such a scenario is calculated, the value of M may be calculated in advance and then inputted into the BS for use, and it may also be calculated by the BS; furthermore, the positions of the M resource blocks in the bandwidth resource may be assumed in advance, which may be at any positions, such as at the lower most part of the bandwidth resource, then the termination position index of the M resource blocks is x=49, the initial position index is x−M+1, and the following formula is used:

1) calculating $$M_0 = \left\lfloor \frac{\sqrt{(N_{RB}^{UL} - x + 1)^2 + \frac{8R}{N}} - 1}{2} \right\rfloor + x - N_{NB}^{UL} = 26;$$

2) $M_0=26$, which is greater than the maximum number of the continuous resource blocks supported by the system $L_{CRB}=50-32=18$, then $$M = \left\lceil \frac{R}{N \cdot L_{Thred}} + \frac{L_{Thred}-1}{2} + \frac{(N_{RB}^{UL}-x)\cdot(1+N_{RB}^{UL}-x)}{2 \cdot L_{Thred}} - N_{RB}^{UL} + x \right\rceil = 30;$$

3) the positions of the M resource blocks in the bandwidth resource: the initial position index is I0=49−30+1=30, and the termination position index is I1=x=49.

The above parameters are listed in Table 7 below:

TABLE 7

| | |
|---|---|
| DL bandwidth(RB) | 50 |
| UL bandwidth(RB) | 50 |
| Number of PHICHs | 32 |
| Number of table_sets | 4 |
| LCRB_threshold | 50 − 32 = 18 |
| Number of available states | 2048 |
| Number of used states | 1275 |
| Number of unused states | 773 |
| Number N of the spare table_sets | 2 |
| Termination position index | 49 |
| Number M of actually supported PRBs | 30 |
| Positions of M PRBs | [20, 49] |

In this embodiment, resource indication values (RIVs) may be used to indicate the uplink shared transmission channel resources and the used mapping relation of resources.

Wherein the RIVs may be calculated by using the formulae (1) and (2) above, and then the relations between the RIVs and table_0, table_1 and table_3 are established in advance. In this way, identical manners of resource allocation with different mapping relations of resources may correspond to different RIVs.

For example, for identical manners of resource allocation, such as $I_{PRB\_RA}^{lowest}=48$, $L_{CRB}=2$, the RIVs are different, as shown in FIG. 8 (in which the numerical values are illustrative only). The RIVs are applicable to the unused states in the system, and are between 1275 and 2047. Hence, relatively large changes are not needed to be made to the original system.

TABLE 8

| RIV | Mapping relations of resources | $I_{PRB\_RA}^{lowest}$ | $L_{CRB}$ |
|---|---|---|---|
| 98 | table_0 | 48 | 2 |
| 1277 | table_1 | 48 | 2 |
| 1279 | Table_3 | 48 | 2 |

It can be seen from above that RIV=98 denotes that $I_{PRB\_RA}^{lowest}=48$, $L_{CRB}=2$ and table_0 is used; RIV=1277 denotes that $I_{PRB\_RA}^{lowest}=48$, $L_{CRB}=2$ and table_1 is used; and RIV=1279 denotes that $I_{PRB\_RA}^{lowest}=48$, $L_{CRB}=2$ and table_3 is used.

Therefore, when the UE receives the RIV transmitted by the transmitter, the index of the allocated smallest resource block $I_{PRB\_RA}^{lowest}=48$ and the number of the virtually continuously allocated resource blocks is $L_{CRB}=2$ may be reversely deducted, and the used spare mapping relation of resources may be obtained. And the PHICH resources may be determined according to the spare mapping relation of resources and the n (DM_RS).

The relation between the above RIVs and the mapping relation of resources and the uplink resources may be predetermined.

Figure 11:
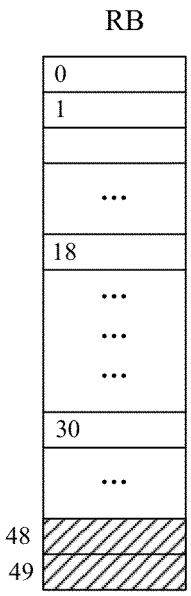
FIG. 11 is a schematic diagram of preliminary allocation of resources of an application example of the present invention.

A process of allocating resources by the BS to one of a plurality of receivers is described below. FIG. 11 is a schematic diagram a case of scheduling a user by a BS to preliminarily determine resources. For the sake of description, only resource blocks occupied by one piece of UE are illustrated.

After the UE is started to establish connection with the BS, the BS schedules a plurality of receivers according to the request for transmission of uplink data transmitted by a plurality pieces of UE, so as to preliminarily determine uplink shared transmission channel resources of the plurality of receivers; the uplink shared transmission channel resources used by one receiver being determined by the lowest resource block index and the number of the resource blocks that are allocated virtually continuously;

if $I_{PRB\_RA}^{lowest}$ allocated by the BS to the UE is 48, and $L_{CRB}=2$;

then the BS uses table_0 first to determine whether there exist PHICH resources occupied by other pieces of UE in an order of n(DM_RS) from 0 to 7; if n(DM_RS)=3, and the state of the corresponding PHICH resource is idle, then the BS may determine that the final n(DM_RS) is 3, and the RIV is 98, and transmit RIV=98 and n(DM_RS)=3 to the UE. Hence, when the UE receives the above information, it may determine that $I_{PRB\_RA}^{lowest}=48$ and $L_{CRB}=2$ according to RIV=98, and determine that table_0 is used, thereby determining the PHICH resources used by the BS for uplink feedback according to n(DM_RS)=3.

If the BS determines whether there exist PHICH resources that have not been occupied by other pieces of UE in an order of n(DM_RS) from 0 to 7 and the result of determination is that the state of use of the PHICH resources of table_0 is not idle, then the BS determines first whether a spare mapping relation of resources, i.e. table_1 or table_3, may be used to allocate the PHICH resources; wherein the following manner may be used for judgment: judging first whether $I_{PRB\_RA}^{lowest}=48$ is between [20,49]; if the result of judgment is positive, then whether $L_{CRB}=2$ is less than $L_{Thred}=18$, and if the result of judgment is positive, then it can be seen that table_1 or table_3 may be used to allocate the PHICH resources.

Figure 12:
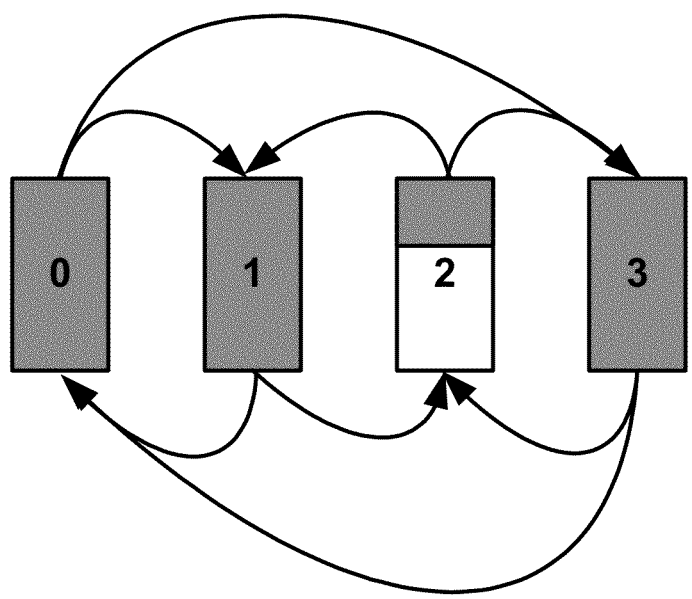
FIG. 12 is a schematic diagram of resource shifting of an application example of the present invention.

In this way, the BS may use table_1 or table_3 to allocate the PHICH resources to the UE. During allocation, whether there exist PHICH resources that have not been occupied by other pieces of UE is still determined one by one in an order of n(DM_RS) from 0 to 7, until an idle PHICH resource is found, so as to determine the final n(DM_RS); if table_1 is used by the BS, then it corresponds to RIV=1277, and if table_3 is used by the BS, then it corresponds to RIV=1279; and if no idle PHICH resource is found after table_1 and table_3 are traversed, the BS estimates whether there exist idle resources in the system; and if the result of judgment is that there exist idle resources in table_2, the BS shifts the resources in table_1 or table_3 to table 2, and then allocates the left PHICH resources to the UE, as shown in FIG. 12.

If it is determined that there exists no idle PHICH resource in table_1, table_2 and table_3, the BS does not allocate resources to the UE any longer, or the BS adjusts the positions of the lowest resource blocks allocated to the UE.

The above description is given taking that the uplink bandwidth resources are 50 as an example, and for other bandwidth systems, the manners of processing are similar to what is described above, and shall not be described any further. With the embodiment of the present invention, collision of PHICH resources may be completely avoided or alleviated. Various cases of avoidance of collision of resources are listed in Table 9 below:

TABLE 9

| Uplink bandwidth (RB) | 25 | 50 | 100 |
|---|---|---|---|
| RIV bit length | 9 | 11 | 13 |
| Number of needed states | 325 | 1275 | 5050 |
| Number of left states | 187 | 773 | 3142 |
| Ng = 1/6, N_PHICH = 16 | Completely eliminated | Completely eliminated | Completely eliminated |
| Ng = 1/2, N_PHICH = 32 | — | Completely eliminated | Almost completely eliminated |
| Ng = 1, N_PHICH = 56 | — | — | Almost completely eliminated |
| Ng = 2, N_PHICH = 104 | — | — | — |

It can be seen from the above embodiment that when the PHICH resources of the current receiver and other receivers collide, other idle PHICH resources may be selected for the current receiver by using spare mapping relations of resources, thereby alleviating or completely avoiding the occurrence of collision of PHICH resources; furthermore, the UE may be notified of the used uplink resources, the used mapping relations of resources and n(DM_RS) by using different RIVs, without needing to change the original system in implementation, thereby saving the cost.

The above apparatuses and methods of the present invention may be implemented by hardware, or by hardware in combination with software. The present invention relates to such a computer-readable program that when the program is executed by a logic device, the logic device is enabled to carry out the apparatus or components as described above, or to carry out the methods or steps as described above. The present invention also relates to a storage medium for storing the above program, such as a hard disk, a floppy disk, a CD, a DVD, and a flash memory, etc.

The present invention is described above in connection with particular embodiments. However, those skilled in the art should be understood that such description is illustrative only, and is not intended to limit the protection scope of the present invention. Various variants and modifications may be made by those skilled in the art in accordance with the spirits and principle of the present invention, and such variants and modifications fall within the scope of the present invention.

What is claimed is:

1. A method of resource allocation, comprising:
   scheduling a plurality of receivers by a transmitter according to requests for transmitting uplink data sent by the plurality of receivers, so as to preliminarily determine the uplink shared transmission channel resources for the plurality of receivers; the uplink shared transmission channel resources used by one receiver being determined by a lowest resource block index and the number of the resource blocks that are allocated virtually continuously;
   determining, respectively for each of the plurality of receivers, the uplink shared transmission channel resources, the used mapping relation of resources and the final cyclic shift n(DM_RS) for indicating an uplink feedback channel, according to the result of scheduling, a predefined mapping relation of resources, a spare mapping relation of resources and the n(DM_RS); wherein the mapping relation of resources refers to the relation between the index of the lowest resource block, the cyclic shift n(DM_RS) and group number and sequence index within the group of the feedback channel;
   notifying the plurality of receivers by the transmitter of the determined uplink shared transmission channel resources of the plurality of receivers, the used mapping relation of resources and the final n(DM_RS).

2. The method according to claim 1, wherein when the transmitter determines, for a current receiver of the plurality of receivers, the uplink shared transmission resources, the used mapping relation of resources and the final n(DM_RS), the method comprises:
   judging one by one by the transmitter by using the predefined mapping relation of resources with the receivers and following the cyclic shift n(DM_RS) whether the feedback channel corresponding to the current receiver has been occupied by other receivers;
   determining the final cyclic shift n(DM_RS) by the transmitter by using the spare mapping relation of resources if the result of judgment is that the feedback channel has been occupied by other receivers, so as to allocate an idle feedback channel to the current receiver.

3. The method according to claim 1, wherein before determining the final cyclic shift n(DM_RS) by the transmitter by using the spare mapping relation of resources, the method further comprises:
   judging by the transmitter whether the spare mapping relation of resources can be used to determine the final cyclic shift n(DM_RS);
   determining the final cyclic shift n(DM_RS) by the transmitter by using the spare mapping relation of resources if the result of judgment is positive.

4. The method according to claim 3, wherein if the result of judgment is that the transmitter cannot use the spare mapping relation of resources to determine the final cyclic shift n(DM_RS), the method further comprises:
   judging further by the transmitter whether receivers having spare mapping relations of resources exist in the other receivers occupying the feedback channel resources;
   judging further by the transmitter whether idle feedback channel resources exist in the system if the result of judgment is that receivers having spare mapping relations of the resources exist;
   shifting the feedback channel resources for the other receivers to the idle feedback channel resources by using the spare mapping relations of resources corresponding to the other receivers if the result of judgment is that idle feedback channel resources exist;
   allocating the feedback channel resources originally had by said other receivers to the current receiver;
   allocating no resource to the current receiver by the transmitter or adjusting by the transmitter the lowest resource block index for the current receiver that is preliminarily determined, if the result of judgment is that no receiver having spare mapping relations of the resources exists, or the result of judgment is that no idle feedback channel exists in the system.

5. The method according to claim 3, wherein judging by the transmitter whether the spare mapping relation of resources can be used to determine the final cyclic shift n(DM_RS) comprises:
   judging whether the lowest resource block of the current receiver that is preliminarily determined is at a position between a predetermined initial position and a predetermined termination position of the resource block capable of using the spare mapping relation of resources;
   judging further whether the number $L_{CRB}$ of resource blocks virtually continuously allocated for the current receiver that is preliminarily determined is smaller than the maximum number $L_{Thred}$ of the continuous resource blocks supported by the system if the result of judgment is positive;

wherein it is determined by the transmitter that the spare mapping relation of resources can be used to determine the final cyclic shift n(DM_RS) if the result of judgment is positive; otherwise, it is determined that the spare mapping relation of resources cannot be used to determine the final cyclic shift n(DM_RS).

6. The method according to claim 5, wherein the judging whether the lowest resource block of the current receiver that is preliminarily determined is at a position between the predetermined initial position and the predetermined termination position of the resource block capable of using the spare mapping relation of resources comprises:

determining the initial position index and the termination position index of the resource block capable of using the spare mapping relation of resources according to the predetermined number M of the resource blocks capable of using the spare mapping relation of resources and the predetermined initial position or termination position corresponding to the resource blocks;

judging by the transmitter that the lowest resource block of the current receiver is at a position between the predetermined initial position and the predetermined termination position of the continuous resource block capable of using the spare mapping relation of resources, if the lowest resource block index $I_{PRB\_RA}^{lowest}$ of the current receiver is smaller than or equal to the termination position index and greater than the initial position index.

7. The method according to claim 6, wherein the method further comprises: determining the number M of the resource blocks capable of using the spare mapping relation of resources, which particularly comprising:

calculating a first calculation value $M_0$, using the following formula:

$$M_0 = \left\lfloor \frac{\sqrt{(N_{RB}^{UL} - x + 1)^2 + \frac{8R}{N}} - 1}{2} \right\rfloor + x - N_{NB}^{UL};$$

if the first calculation value $M_0$ is smaller than or equal to the maximum number $L_{Thred}$ of the continuous resource blocks supported by the system, $M = M_0$, wherein the maximum number of the continuous resource blocks supported by the system is $L_{Thred} = N_{NB}^{UL} - N_{PHICH}$;

if the first calculation value $M_0$ is greater than the maximum number $L_{Thred}$ of the continuous resource blocks supported by the system, the M is calculated using the following formula:

$$M = \left\lceil \frac{R}{N \cdot L_{Thred}} + \frac{L_{Thred} - 1}{2} + \frac{(N_{RB}^{UL} - x) \cdot (1 + N_{RB}^{UL} - x)}{2 \cdot L_{Thred}} - N_{RB}^{UL} + x \right\rceil;$$

where, x represents the termination position index of the resource block capable of using the spare mapping relation of resources, $N_{RB}^{UL}$ represents the band width of the system, N represents the number of the spare mapping relation of resources, and $N_{PHICH}$ represents the number of the feedback channels that can be used by the system.

8. The method according to claim 1, wherein the spare mapping relation of resources is related to the number of groups of the feedback channels in the system;

and when the number of groups of the feedback channels is 2, the number N of the spare mapping relation of resources is 1; and when the number of groups of the feedback channels is greater than 2, the number N of the spare mapping relation of resources is 2.

9. The method according to claim 1, wherein the transmitter uses several bits in a downlink control channel indicating the initial position and the virtually continuously-occupied resource length in the system band width of the PUSCH corresponding to the current user to notify the receivers.

10. The method according to claim 1, wherein the method further comprises:

receiving, by the at least one receiver, the uplink shared transmission channel resources, the used mapping relation of resources and the final n(DM_RS), transmitted by the transmitter.

11. A transmitter, comprising:

a scheduling unit for scheduling a plurality of receivers according to the request for transmitting uplink data sent by the plurality of receivers, so as to preliminarily determine the uplink shared transmission channel resources of the plurality of receivers; the uplink shared transmission channel resources used by one receiver being determined by a lowest resource block index and the number of the resource blocks that are allocated virtually continuously;

a resource allocating unit for determining, respectively for each of the plurality of receivers, the uplink shared transmission channel resources, the used mapping relation of resources and the final cyclic shift n(DM_RS) for indicating an uplink feedback channel, according to the result of scheduling, a predefined mapping relation of resources, a spare mapping relation of resources and the n(DM_RS); wherein the mapping relation of resources refers to the relation between the index of the lowest resource block, the cyclic shift n(DM_RS) and group number and sequence index within the group of the feedback channel; and a resource notifying unit for notifying the plurality of receivers of the determined uplink shared transmission channel resources of the plurality of receivers determined by the resource allocating unit, the used mapping relation of resources and the final cyclic shift n(DM_RS).

12. The transmitter according to claim 11, wherein when determining the uplink shared transmission resources of a current receiver of the plurality of receivers, the used mapping relation of resources and the final cyclic shift n(DM_RS), the resource allocating unit comprises:

a first judging unit for judging one by one by using the predefined mapping relation of resources with the receivers and following the cyclic shift n(DM_RS) whether the feedback channel corresponding to the current receiver has been occupied by other receivers; and an information determining unit for determining the final cyclic shift n(DM_RS) by using the spare mapping relation of resources if the result of judgment is that the feedback channel has been occupied by other receivers, so as to allocate an idle feedback channel to the current receiver.

13. The transmitter according to claim 11, wherein the resource allocating unit further comprises:

a second judging unit for judging whether the spare mapping relation of resources can be used to determine the final cyclic shift n(DM_RS) if the result of judgment of the first judging unit is positive;

and the information determining unit determines the final cyclic shift n(DM_RS) by using the spare mapping relation of resources if the result of judgment of the second judging unit is positive.

14. The transmitter according to claim 13, wherein the resource allocating unit further comprises:
   a third judging unit for judging further whether receivers having spare mapping relations of resources exist in the other receivers occupying the feedback channel resources if the result of judgment of the second judging unit is negative;
   a fourth judging unit for judging further whether idle feedback channel resources exist in the system if the result of judgment of the third judging unit is that receivers having spare mapping relations of the resources exist;
   a resource shifting unit for shifting the feedback channel resources of the other receivers to the idle feedback channel resources by using the spare mapping relations of resources corresponding to the other receivers if the result of judgment of the fourth judging unit is positive, and allocating the feedback channel resources originally had by said other receiver to the current receiver; and
   a processing unit for allocating no resource to the current receiver or adjusting the lowest resource block index of the current receiver that is preliminarily determined, if the results of judgment of the third judging unit and the fourth judging unit are negative.

15. The transmitter according to claim 13, wherein the second judging unit comprises:
   a fifth judging unit for judging whether the lowest resource block of the current receiver that is preliminarily determined is at a position between the predetermined initial position and the predetermined termination position of the resource block capable of using the spare mapping relation of resources; and
   a sixth judging unit for judging further whether the number $L_{CRB}$ of resource blocks virtually continuously allocated by the current receiver that is preliminarily determined is smaller than the maximum number $L_{Thred}$ of the continuous resource blocks supported by the system, and the spare mapping relation of resources can be used to determine the final cyclic shift n(DM_RS), if the result of judgment is positive; otherwise, the spare mapping relation of resources cannot be used.

16. The transmitter according to claim 15, wherein the fifth judging unit comprises:
   an index determining unit for determining the initial position index and the termination position index of the continuous resource block capable of using the spare mapping relation of resources according to the predetermined number M of the resource blocks capable of using the spare mapping relation of resources and the predetermined initial position or termination position corresponding to the continuous resource blocks; and
   a position determining unit for determining that the lowest resource block of the current receiver is at a position between the predetermined initial position and the predetermined termination position of the resource block capable of using the spare mapping relation of resources when the lowest resource block index $I_{PRB\_RA}^{lowest}$ of the current receiver is smaller than or equal to the termination position index and greater than the initial position index.

17. A wireless communication system, comprising at least one transmitter and at least one receiver, the transmitter allocating resources to the at least one receiver by using the method as claimed in claim 1.

18. The system according to claim 17, wherein the at least one receiver comprises a request transmitting unit configured to transmit a request for transmitting uplink data to the transmitter, such that the transmitter allocates resources to the receiver according to the request.

19. A non-transitory computer readable medium including a program, when the program is executed in a transmitter, the program enables the transmitter to carry out the method of resource allocation as claimed in claim 1.

20. A non-transitory storage medium in which a computer readable program is stored, wherein the program enables a computer executing the program to carry out the method of resource allocation as claimed in claim 1.

* * * * *